(12) United States Patent
Hutchinson et al.

(10) Patent No.: US 12,311,603 B2
(45) Date of Patent: May 27, 2025

(54) METHODS AND SYSTEM FOR REMOVAL OF POWDER FROM AN ADDITIVELY MANUFACTURED PART

(71) Applicant: PostProcess Technologies, Inc., Buffalo, NY (US)

(72) Inventors: Daniel Joshua Hutchinson, Orchard Park, NY (US); Owen Wegman, Buffalo, NY (US); Gary Burch, West Seneca, NY (US); Anthony Wesley, Machias, NY (US); Craig Ostrum, Buffalo, NY (US); Daniel Fuglewicz, Getzville, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 92 days.

(21) Appl. No.: 17/917,674

(22) PCT Filed: Apr. 14, 2021

(86) PCT No.: PCT/US2021/027193
§ 371 (c)(1),
(2) Date: Oct. 7, 2022

(87) PCT Pub. No.: WO2021/211658
PCT Pub. Date: Oct. 21, 2021

(65) Prior Publication Data
US 2023/0150203 A1 May 18, 2023

Related U.S. Application Data

(60) Provisional application No. 63/010,464, filed on Apr. 15, 2020.

(51) Int. Cl.
*B29C 64/35* (2017.01)
*B08B 7/02* (2006.01)
(Continued)

(52) U.S. Cl.
CPC .............. *B29C 64/35* (2017.08); *B08B 7/026* (2013.01); *B08B 15/04* (2013.01); *B22F 10/68* (2021.01);
(Continued)

(58) Field of Classification Search
CPC ..... B29C 64/35; B29C 64/153; B29C 64/245; B29C 64/255; B29C 64/357; B29C 64/30;
(Continued)

(56) References Cited

U.S. PATENT DOCUMENTS 4,300,318 A 11/1981 Brown
7,037,382 B2 * 5/2006 Davidson .............. B29C 64/357
134/198

(Continued)

FOREIGN PATENT DOCUMENTS

JP 2001150556 A 6/2001
JP 2018039252 A 3/2018
(Continued)

OTHER PUBLICATIONS

Extended European Search Report from European Patent Application No. 21788578.9, dated Apr. 8, 2024, 8 pages.
(Continued)

*Primary Examiner* — Alexander Markoff
(74) *Attorney, Agent, or Firm* — Lempia Summerfield Katz LLC

(57) ABSTRACT

A system and method are disclosed for removal of unwanted material from additively manufactured parts by application of vibratory and/or acoustic energy. The system and method include a vibratory platform located in a chamber. Additively manufactured parts having unwanted material adhered thereto are placed on the vibratory platform. The platform is caused to vibrate thereby causing the unwanted material to detach from the parts. The system and method may also
(Continued)

include the application of acoustic energy to cause unwanted material to detach from the parts. Advantageously, the unwanted material removed from the additively manufactured object can be recycled.

17 Claims, 11 Drawing Sheets

(51) Int. Cl.
*B08B 15/04* (2006.01)
*B22F 10/68* (2021.01)
*B33Y 40/20* (2020.01)
*B22F 10/28* (2021.01)
*B29C 64/153* (2017.01)

(52) U.S. Cl.
CPC .............. *B33Y 40/20* (2020.01); *B22F 10/28* (2021.01); *B29C 64/153* (2017.08)

(58) Field of Classification Search
CPC ....... B29C 64/227; B29C 64/25; B08B 7/026; B08B 15/04; B08B 7/02; B08B 7/028; B22F 10/68; B22F 10/28; B22F 3/003; B22F 2003/247; B22F 2202/01; B22F 2999/00; B22F 10/73; B22F 12/00; B22F 12/82; B22F 12/88; B22F 12/90; B22F 10/20; B33Y 40/20; B33Y 30/00; B33Y 10/00; Y02P 10/25; H04N 7/18
See application file for complete search history.

(56) References Cited

U.S. PATENT DOCUMENTS

| | | | |
|---|---|---|---|
| 8,017,055 B2 * | 9/2011 | Davidson | B33Y 40/20 |
| | | | 425/130 |
| 11,110,661 B2 * | 9/2021 | Hutchinson | B08B 3/12 |
| 2001/0045678 A1 * | 11/2001 | Kubo | B29C 64/35 |
| | | | 425/375 |
| 2002/0090410 A1 * | 7/2002 | Tochimoto | B29C 64/357 |
| | | | 425/215 |
| 2015/0266158 A1 * | 9/2015 | Summers | B24B 27/033 |
| | | | 29/564.7 |
| 2015/0266211 A1 * | 9/2015 | Wolfgang | B33Y 40/20 |
| | | | 425/424 |
| 2016/0279871 A1 | 9/2016 | Heugel | |
| 2016/0288420 A1 * | 10/2016 | Anderson, Jr. | B33Y 40/20 |
| 2017/0246808 A1 * | 8/2017 | Höchsmann | B33Y 30/00 |
| 2017/0348910 A1 | 12/2017 | Hutchinson | |
| 2018/0009007 A1 * | 1/2018 | Craft | B08B 7/026 |
| 2019/0022942 A1 * | 1/2019 | Fulop | B29C 64/357 |
| 2019/0202126 A1 * | 7/2019 | Hutchinson | B05B 14/40 |
| 2019/0315065 A1 * | 10/2019 | Hutchinson | B29C 64/35 |
| 2020/0055250 A1 * | 2/2020 | Vodermair | B29C 64/379 |
| 2020/0079012 A1 * | 3/2020 | Pawliczek | B29C 64/205 |

FOREIGN PATENT DOCUMENTS

| | | | | |
|---|---|---|---|---|
| WO | 2015071184 A1 | 5/2015 | | |
| WO | 2017087451 A1 | 5/2017 | | |
| WO | WO-2018093958 A1 * | 5/2018 | ............. | B08B 3/12 |
| WO | 2019206951 A1 | 10/2019 | | |

OTHER PUBLICATIONS

Office Action from Japanese Patent Application No. 2022-562479, dated Mar. 25, 2025.

* cited by examiner

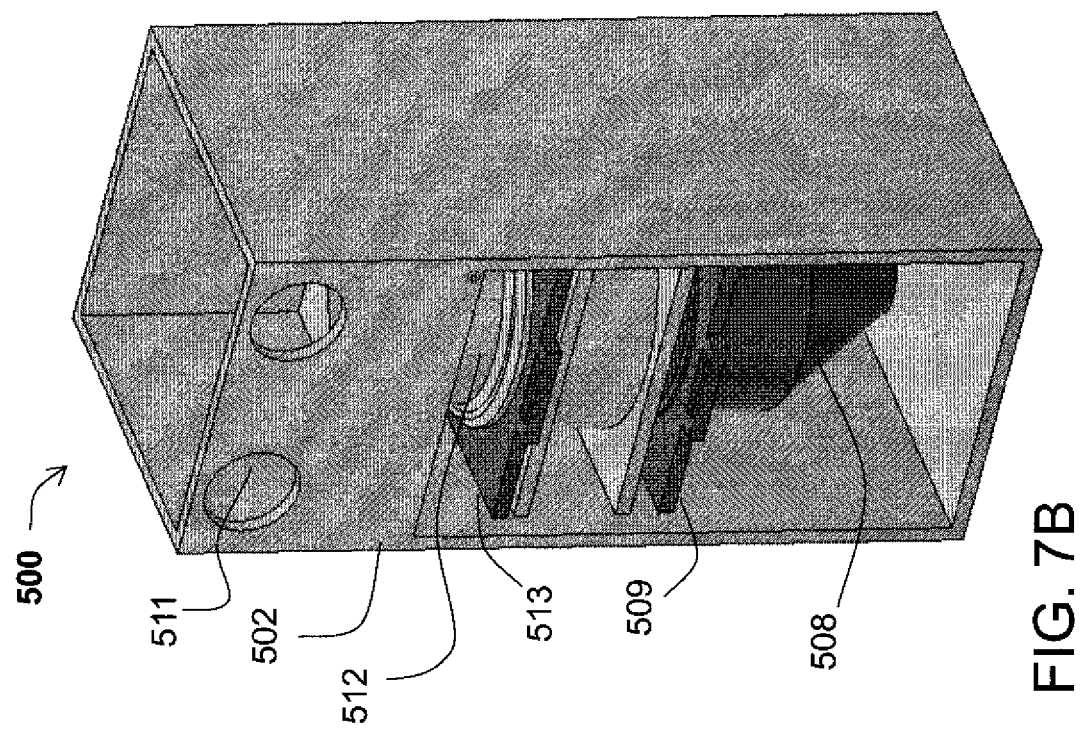
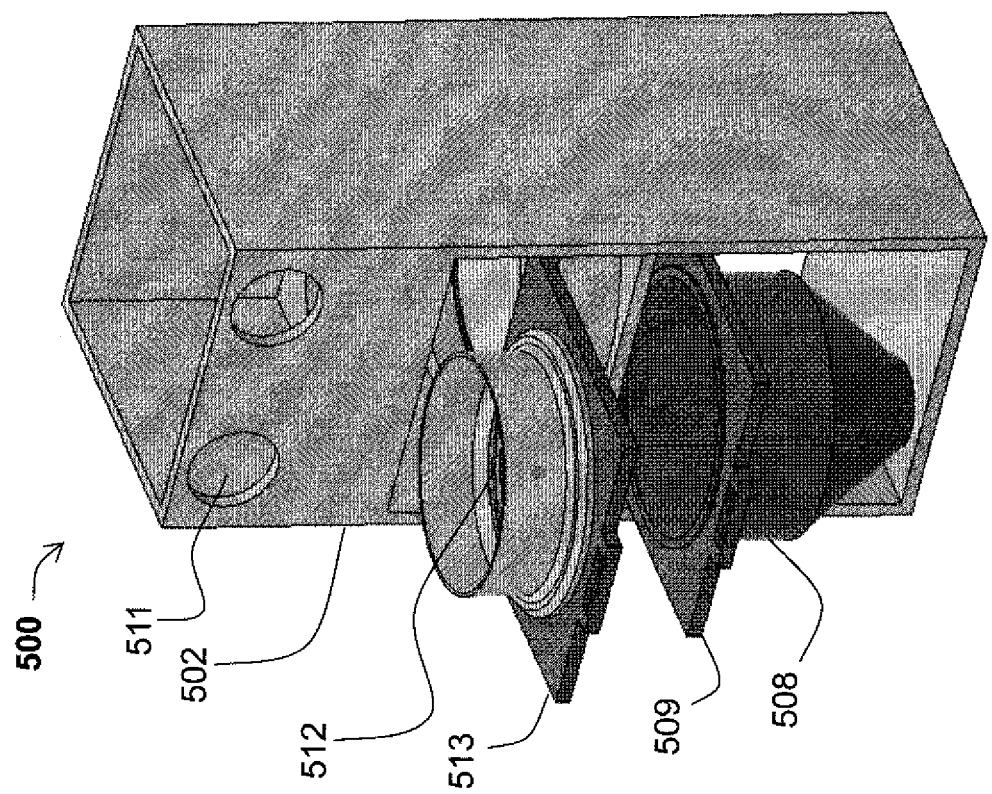
FIG. 7B
FIG. 7A

METHODS AND SYSTEM FOR REMOVAL OF POWDER FROM AN ADDITIVELY MANUFACTURED PART

CROSS-REFERENCE TO RELATED APPLICATION

This application claims the benefit of priority to U.S. provisional patent application Ser. No. 63/010,464, filed on Apr. 15, 2020.

FIELD OF THE INVENTION

This disclosure relates generally to additive manufacturing and in particular to a system and method for removing unwanted material from parts made by a 3D printer in a printing stage of the overall additive manufacturing process.

BACKGROUND OF THE INVENTION

In some kinds of additive manufacturing processes (also referred to as 3D printing processes), such as Selective Laser Sintering (SLS), Electron Beam Melting (e-beam), Multi-Jet Fusion (MJF), or Powder Bed Fusion (PBF), solid objects are manufactured using a computer-controlled beam or print head to fuse or solidify portions (such as the walls) of the object a layer at a time until the entire three-dimensional object is formed. After the solid three-dimensional object is formed, unwanted material, such as a powder from which the object was formed, may cling to or encase the solid object. It is necessary to remove this unwanted material from the solid printed object before the next step, which may include painting, curing, passivation, coating, assembly, and so on. Removal of unwanted powder material from additively manufactured parts is sometimes referred to as decaking or depowdering. In some additive manufacturing processes, printed objects have unwanted support material on them after the printing stage. Some additively manufactured objects may have rough surfaces or build lines after being formed by the printer. Finishing processes are needed to remove unwanted material, such as powder or support material, or to smooth rough surfaces of additively manufactured objects.

Additional disclosure about techniques and processes for additive manufacturing and removal of unwanted material from objects formed by additive manufacturing can be found in copending patent applications, US20190176403, US20190202126, US20190270248, US20190275745, US20190315065, US20170348910, and PCT/US2020/041396, which are assigned to the owner of the present application and the entire disclosures of which are incorporated by reference herein.

SUMMARY OF THE INVENTION

A system and method are disclosed for removal of unwanted material from additively manufactured parts by application of vibratory and/or acoustic energy. The system and method include a vibratory platform located in a chamber. Additively manufactured parts having unwanted material adhered thereto are placed on the vibratory platform. The platform is caused to vibrate thereby causing the unwanted material to detach from the parts. The system and method may also include the application of acoustic energy to cause unwanted material to detach from the parts. The unwanted material removed from the additively manufactured parts can be collected and recycled.

BRIEF DESCRIPTION OF THE FIGURES

FIGS. 7A and 7B are perspective views of a portion of another embodiment of a system for removing unwanted material from additively manufactured parts.

DETAILED DESCRIPTION OF THE INVENTION

Although the invention will be described in terms of certain examples, other examples, including examples that do not provide all of the benefits and features set forth herein, are also within the scope of the invention. Various changes to the system and method may be made without departing from the scope of the invention.

Figure 1:
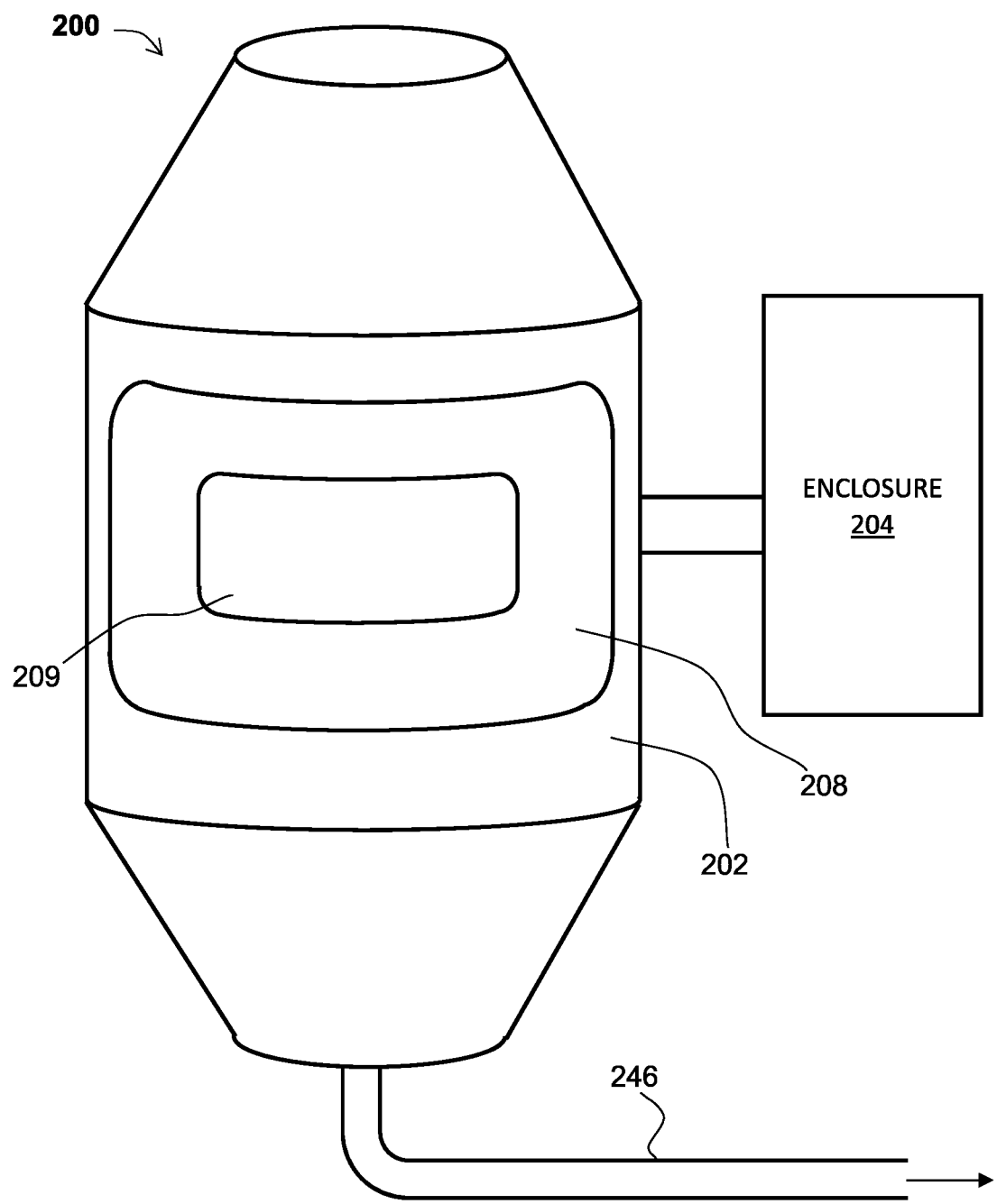
FIG. 1 is a perspective view showing an embodiment of a system for removing unwanted material from additively manufactured parts.

An embodiment of a system 200 for removing unwanted material from additively manufactured parts (also referred to herein as "objects") is shown in FIG. 1. The system 200 includes a chamber 202 and an adjacent enclosure 204. The chamber 202 has a door 208 that can be opened and closed. The door 208 provides access to a chamber interior 210 (shown in FIG. 2). The door 208 includes a seal around it to prevent or reduce air, powder, or sound leakage from the chamber 202. The chamber 202 has a size suitable for containing therein additively manufactured parts (also referred to as "objects"), including the unwanted material formed in that portion of the additive manufacturing process performed by a 3D printer. The chamber 202 and the door 208 may be made of a suitable, durable material such as plastic, metal (e.g., stainless steel, polycarbonate), or a combination thereof. The chamber 202 also includes a viewing pane 209. The viewing pane 209 is composed of a transparent material such as glass or plastic. The viewing pane 209 enables an operator to view the chamber interior 210. The viewing pane 209 is located in a wall of the chamber. In one embodiment, the viewing pane 209 is located in the chamber door 208.

Figure 2:
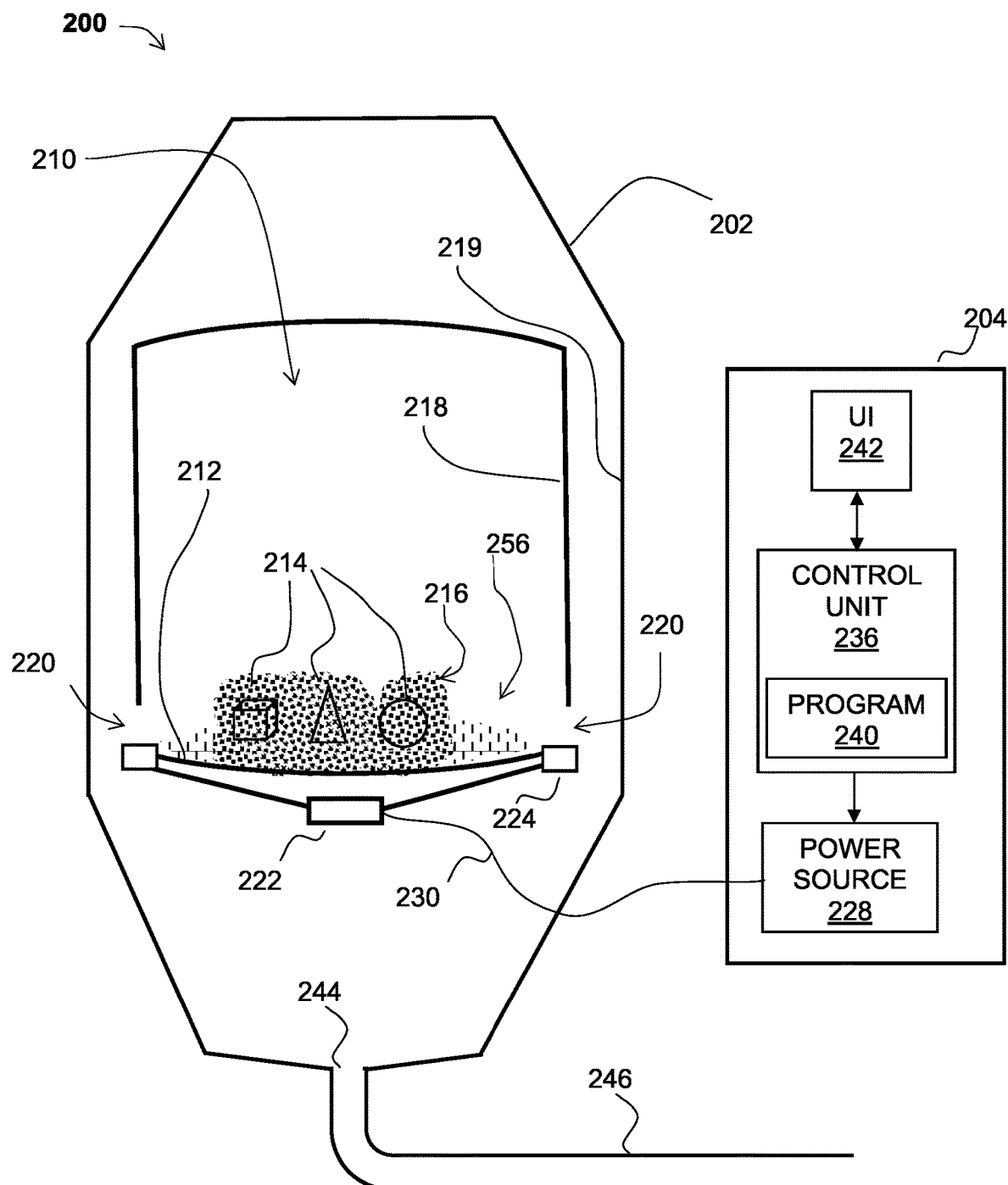
FIG. 2 is a cutaway side view of the embodiment shown in FIG. 1.

FIG. 2 shows a cutaway view of the chamber 202. Located in the interior 210 of the chamber 202 is a platform 212. The platform 212 is made of a durable material.

Suitable materials include a metal, such as stainless steel, aluminum, plastic, cardboard, or paper. The platform 212 is sized and adapted for having placed thereupon one or more parts 214 that had been formed by an additive manufacturing process, such as SLS. In one embodiment, the platform 212 is circular with a diameter of approximately 25 cm (10 inches) although other sizes are suitable. In this embodiment, the parts 214 are approximately 2.4 to 4 grams. The quantity of parts 214 that can be placed on the platform 212 and finished at one time can vary. In this embodiment, between 6 and 110 or more or fewer parts can be placed on the platform 212 and finished at one time. Other quantities may also be suitable. When formed by the additive manufacturing process, the parts 214 have unwanted material 216 remaining thereupon. In this example, the unwanted material 216 is a nylon powder. Further, when formed by this additive manufacturing process, the parts 214 may be encased in the unwanted powder material 216.

As shown in FIG. 2, an interior wall 218 of the chamber 202 is spaced from an outer wall 219. In this embodiment, the interior wall 218 extends around the entire perimeter of the interior 210 of the chamber 202 spaced inward from the outer wall 219. The interior wall 218 defines an inner portion of the interior 210. In this embodiment, the inner wall 218 is open on a top side. The platform 212 is mounted in the chamber 202 so that it is spaced from the interior wall 218, thereby forming a gap 220 between an edge of the platform 212 and the interior wall 218. The gap 220 does not need to extend around the entire perimeter of the platform 202. The gap 220 has a size narrow enough to prevent any of the objects 214 located on the platform 212 from falling though the gap 220, but wide enough so that any unwanted material 216 detaching from the objects 214 can pass though the gap 220 during the finishing process. In one embodiment, the gap 220 is approximately 1.27 cm (½ inch), but other sizes may be suitable depending on the size of the parts to be placed on the platform 212.

The platform 212 is mounted in the chamber 202 so that it can move (i.e., vibrate). This can be accomplished in various different ways. One suitable way is to make the connection between the platform 212 and the chamber 202 a flexible connection. Another way is to provide a hinged or loose connection. Another way is to provide a solid fixed rim 224 that is fixed to the chamber outer wall 219, but which has a flexible connection to a middle portion of the platform 212, similar to a speaker diaphragm.

Connected to the underside of the platform 212 is a transducer 222. The transducer 222 is operatively connected to the platform 212 to impart vibrations to it. In one embodiment, the transducer is an electromagnetic coil. The transducer 222 is connected to a power source 228 by means of a wire or cable 230. The power source 228 is located outside the chamber 202 in the enclosure 204 located adjacent to the chamber 202. The cable 230 extends through the walls of the chamber 202 and the enclosure 204 to connect the transducer 222 to the power source 228. In one embodiment, the power source 228 is an amplifier.

In the enclosure 204 is a control unit 236. In alternative embodiments, the control unit 236 may be located remotely. The control unit 236 is operatively connected to the hardware of system 200, including the power source 228. In one embodiment, the control unit 236 is a personal computer (PC) running a suitable operating system, such as the Windows® operating system. Alternatively, the control unit 236 may be any other computing platform, including a smartphone running Android or iOS. In one embodiment, the control unit 236 and power source 228 are combined into one unit.

The control unit 236 includes appropriate programming 240 by which the system 200 can be operated, as explained below.

Connected to the control unit 236 is a user interface 242. The user interface 242 includes a touch screen or other hardware for receiving input from a (human) user operator and providing an information output to the user operator. In the embodiment shown in FIG. 2, the user interface 242 is shown located on the enclosure 204. In alternative embodiments, the user interface 242 may be located elsewhere, including remotely.

Located in the bottom floor of the chamber 202 is a discharge chute 244. The discharge chute 244 connects to a discharge exhaust 246 for removing the unwanted material 216 that is removed from the parts 214. The exhaust 246 is connected to a vacuum or suction to withdraw the unwanted material 216 from the chamber 202. A filter system (not shown) may be included in-line with the exhaust 246 to catch particles.

Operation

Figure 3:
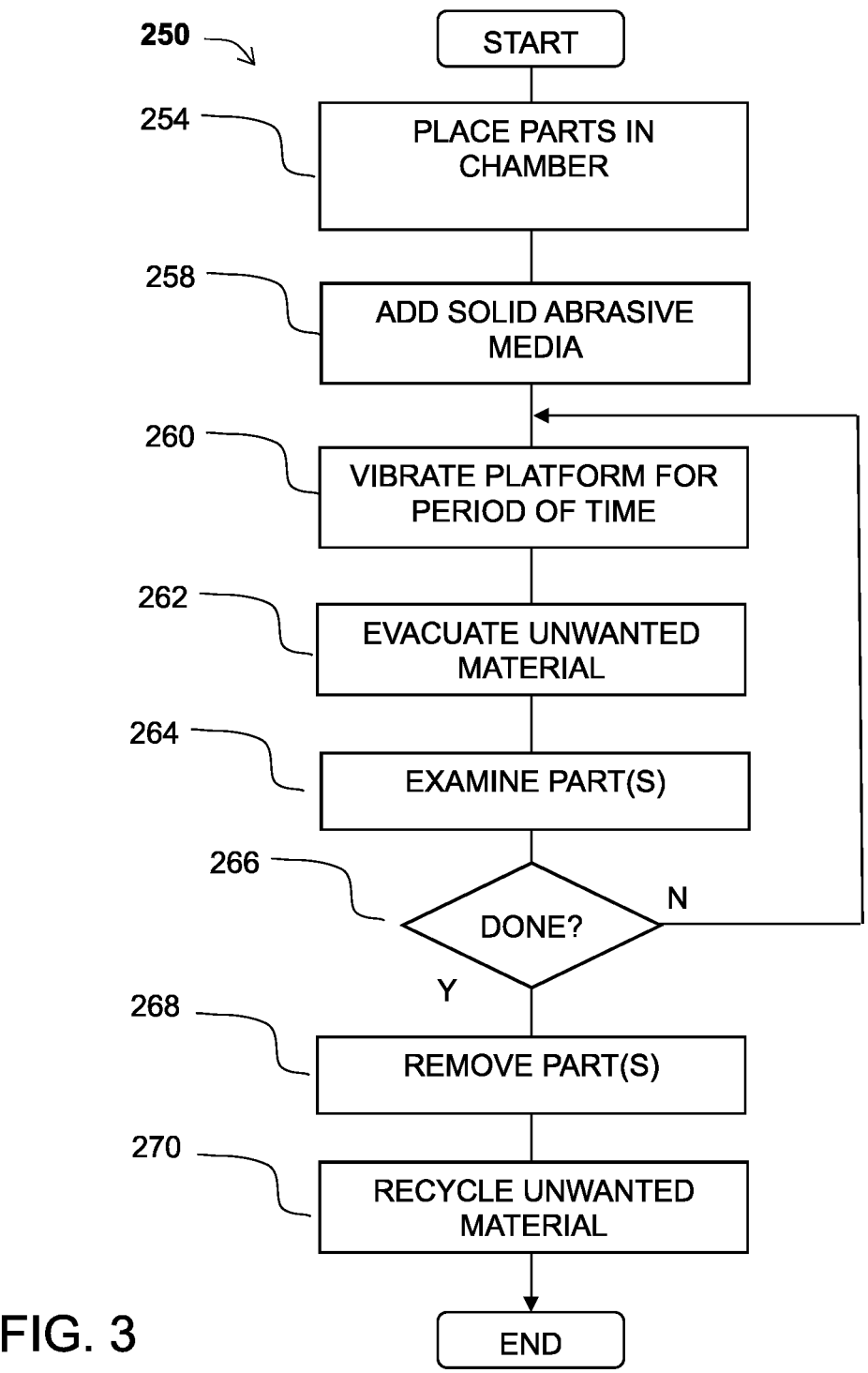
FIG. 3 is a flowchart showing an embodiment of a process performed by the system of FIGS. 1 and 2 for removing unwanted material from additively manufactured parts.

FIG. 3 shows a flowchart of a process 250 performed by or with the system 200 of FIGS. 1 and 2. In step 254, the objects 214, which had been manufactured by an additive manufacturing process and which are encased in unwanted material (e.g., powder) 216, are placed in the system 200, specifically on the platform 212 inside the chamber 202.

Next, solid abrasive media 256 is placed on the platform 212 (Step 258). This step is optional and may be omitted in some embodiments. The solid abrasive media 256 can be mixed or interspersed with the parts 214. In one embodiment, the solid abrasive media 256 is UPM. In another example, plastic acrylic media particles having an irregular shape are used. Other kinds of solid abrasive media may be suitable, including M-CAT. The amount of solid abrasive media 256 placed on the platform is dependent on the quantity and sizes of the parts 214. In one embodiment, approximately ½ cup of solid abrasive media 256 is used. After the parts 214 encased in unwanted material 216 and the solid abrasive media 256 are placed on the platform 212 in the chamber 202, the door 208 is closed.

Figure 8A:
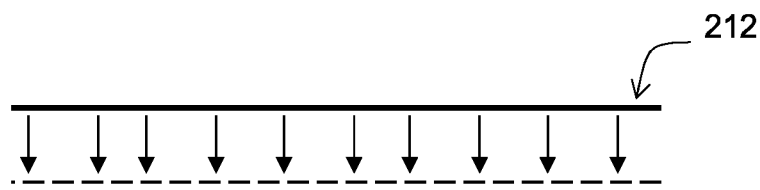
FIGS. 8A, 8B, and 8C depict different types of vibrations that can be used in the embodiments disclosed herein.
Figure 8B:
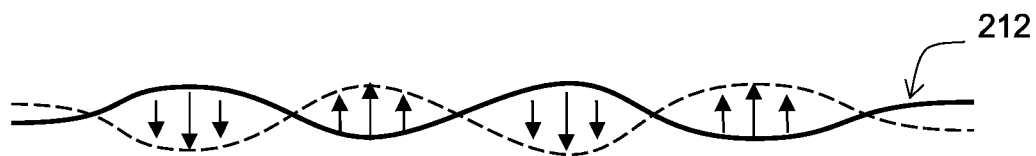
Figure 8C:
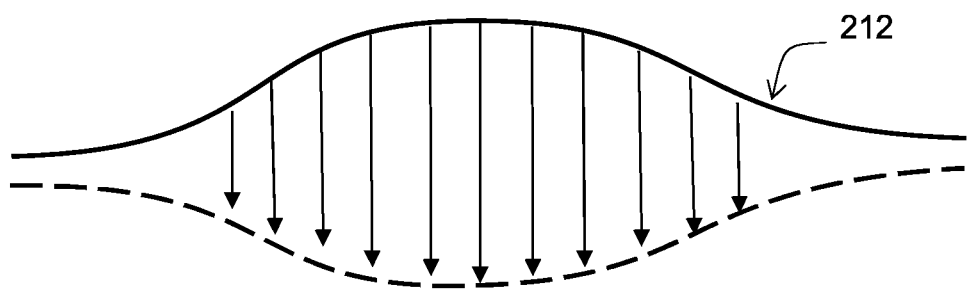

The control unit 236 is operated (e.g., by means of the user interface 242) to cause the power source 228 to energize the transducer 222 thereby causing the platform 212 to vibrate (Step 260). There are different kinds of vibration that can be applied to the vibratory platform 212. FIGS. 8A, 8B, and 8C depict different types of vibrations that can be applied to the platform 212. (The depictions in FIGS. 8A, 8B and 8C are not necessarily to scale. These types of vibrations are not the only types that can be applied and other types may be suitable.) In FIG. 8A, a uniformly vertical vibratory action is depicted. In this type of vibration, the platform surface moves uniformly across its width with an up and down motion, similar to an audio speaker. FIG. 8B shows the platform 212 vibrating with a sinusoidal motion, in which parts of the platform move upward while other parts move downward at the same time. This type of vibration is characteristic of Chladni plates in which locations of movement are separated by relatively stationary locations, corresponding to nodes of relative stability. FIG. 8C shows another type of vibratory motion in which the platform 212 moves with a trampoline-type of motion, with a central portion having a large amplitude with the amplitude diminishing toward the edges.

An objective in selecting a type of vibration (as well as selecting a waveform, frequency and amplitude of vibration) is to separate the additively manufactured parts from the unwanted material attached thereto. One way to effect this separation is to impart disparate movement between the additively manufactured parts and the unwanted material, thereby causing the unwanted material to detach from the additively manufactured parts. In some cases, the type of vibratory action is selected to impart a resonance with either the additively manufactured parts or the unwanted material, but not both. For example, a vibration can be selected that causes the unwanted material to resonant at a certain frequency, but that causes the additively manufactured parts to not vibrate at all. In another case, the type of vibratory action is selected to impart a resonance with the additively manufactured parts at a first frequency and to impart a resonance with the unwanted material at a second, different frequency. Thus, causing the additively manufactured parts or the unwanted material to vibrate differently from the other can effect detachment of the unwanted material from the additively manufactured parts. Further, selection of an appropriate vibration can also cause the unwanted material to move away from the additively manufactured parts and even cause the unwanted material to move off the platform, in a manner similar to how powder can be caused to accumulate at nodes on a Chladni plate.

Reference is made to applications in cymatics that address and describe wave phenomena. The selection of the type of vibration, the type of waveform, the frequency and amplitude of vibration, the duration of vibration, and whether different types of waveforms, frequencies, or amplitudes are used depends on several factors. These factors include the material composition of the additively manufactured parts, the sizes and geometry of the additively manufactured parts, the amount of unwanted material attached to the additively manufactured parts, and other factors.

Figure 4:
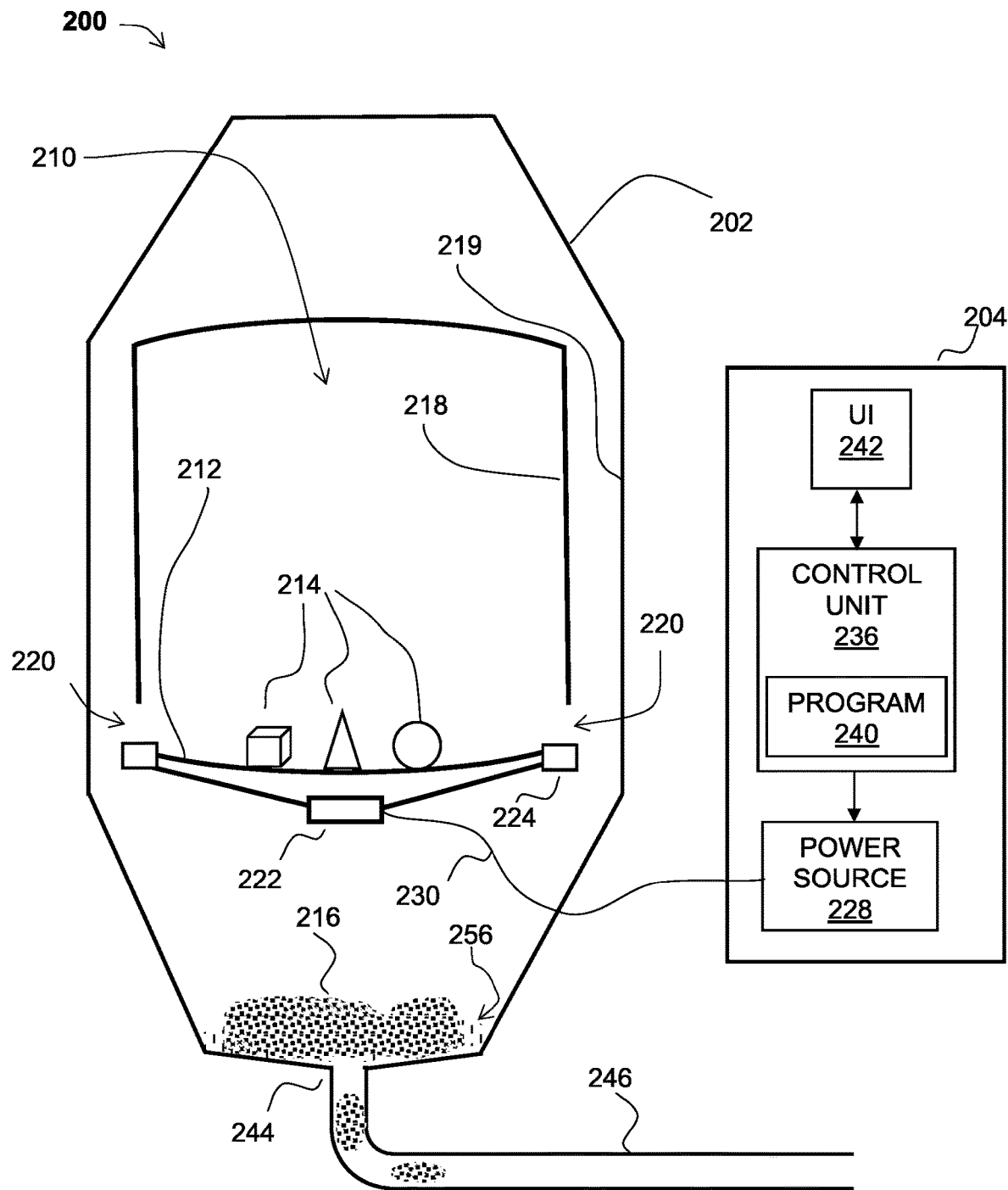
FIG. 4 shows the embodiment of FIG. 2 at a stage of the process of FIG. 3.

Referring again to FIG. 3, in this embodiment, the power source 228 applies a sinusoidal wave to the transducer 222. In alternative embodiments, other types of waveforms may be suitable. In this embodiment, the platform 212 is vibrated at a frequency of between 75 and 135 Hertz, although other frequencies may be suitable. The platform 212 is vibrated for a period of time. In this embodiment, the platform 212 is vibrated for 30 minutes. Other durations of time may be suitable. While the platform 212 is being vibrated, the vibration of the platform 212 is transferred to the parts 214 and the unwanted material 216 located on the platform 212, Movement is imparted between the parts 214 and the unwanted material 216. The vibration of the vibratory platform 212 causes the unwanted material 216 to detach from the parts 214. The solid abrasive media 254, shaking among the parts 214, helps with this process. In cases in which the parts 214 are relatively small, the vibratory amplitude large, or the vibratory frequency low, the parts 214 may bounce on the platform 212. In cases in which the parts 214 are relatively large, the vibratory amplitude small, or the vibratory frequency high, the parts 214 may remain relatively stationary on the platform 212. As the vibratory action continues, some or all the unwanted material 216 that has detached from the parts 214 eventually moves or bounces to the edge of the platform 212 and falls through the gap 220 to the bottom of the chamber 202, as shown in FIG. 4. Some or all the abrasive material 254 may also fall to the bottom of the chamber 202. Because the parts 214 are too large to fall through the gap 220, they remain on the platform 212, As the unwanted material 216 accumulates at the bottom of the chamber 202, it can be evacuated through the chute 244 and exhaust 246 by suction or other means (Step 262, in FIG. 3).

Referring to FIG. 3, the parts 214 can be examined to determine if the unwanted material has been sufficiently removed (Step 264). This step may be performed manually (e.g., by an operator) by stopping the vibration and examining the parts 214. Alternatively, this step may be performed using machine vision, or other automatic processes. If it is determined that the parts 214 need more finishing, the parts 214 are placed again on the platform 212 and the platform 212 is vibrated again (Steps 266 and 260). The parts 214 may be rotated or moved on the platform 212 to facilitate powder removal. The steps of vibrating the parts 214 on the platform 212 and then examining them may be conducted as many times as needed.

Upon examination, if it is determined that the parts 214 are sufficiently finished (e.g., sufficient unwanted material 216 has been removed), the parts 214 can be removed from the chamber 202 (Steps 266 and 268). The unwanted material 216 that had been removed from the parts 214 is recycled or otherwise disposed of (Step 270). Then, the process 250 ends. The parts 214 are ready for the next stage, which may include further powder removal, curing, washing, painting, passivation, assembly, and so on.

Alternative Embodiments

First Alternative Embodiment

Figure 5:
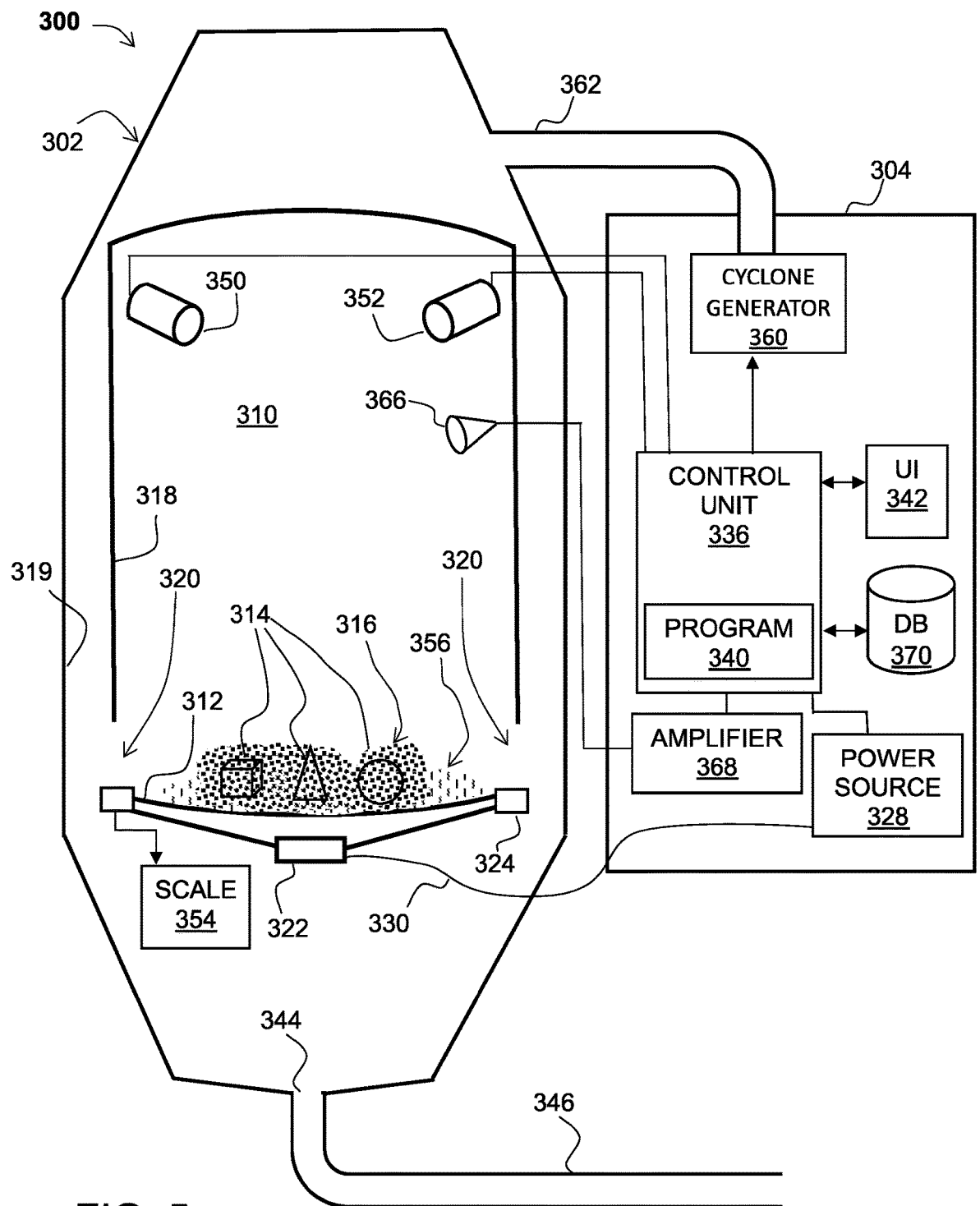
FIG. 5 is a cutaway side view of another embodiment of a system for removing unwanted material from additively manufactured parts.

FIG. 5 shows another embodiment of a system for removing unwanted material from additively manufactured parts. In FIG. 5, a system 300 includes components that are similar to those described in connection with the embodiment of the system 200 shown in FIGS. 1, 2, and 4. The system 300 includes a chamber 302 having a door (not shown, but similar to the door 208 in FIG. 1) and an adjacent enclosure 304. Located in an interior of the chamber 302 is a platform 312, sized and adapted for having placed thereupon additively manufactured parts 314 that have unwanted material (e.g., nylon powder) 316 remaining thereupon and encasing in the parts 314.

The platform 312 is spaced from an interior wall 318 of the chamber 302, by a gap 320. A transducer (or actuator) 322 is operatively connected to an underside of the platform 312 to impart vibrations to it. The transducer 322 is connected by a cable 330 to a power source 328 located in the enclosure 304. A control unit 336 is operatively connected to the hardware of system 300, including the power source 328 and a user interface 342. The control unit 336 includes appropriate programming 340. A discharge chute 344 is located in the bottom floor of the chamber 302 and connects to a discharge exhaust 346.

The system 300 also includes one or more cameras 350. The cameras 350 are located in the chamber 302 adjacent to and/or above the platform 312. The cameras 350 are connected to the control unit 336 by appropriate means, such as cabling. The cameras 350 are oriented and adapted to obtain imagery (including video) of the interior of the chamber 302 including anything located on the platform 312 such as the parts 314, the unwanted material 316, and the solid abrasive media 356, if any.

The system 300 also includes one or more additional sensors 352. The additional sensors 352 are located in the chamber 302 adjacent to and/or above the platform 312.

These additional sensors 352 are connected to the control unit 336 by appropriate means, such as cabling. These additional sensors 352 may include one or more microphones, thermometers, accelerometers, scanners, radar, lidar, and so on. These additional sensors 352 are adapted to measure properties of anything on the platform 312 or in the chamber 302.

The system 300 also includes a scale 354. The scale 354 is located in the chamber 302 and connected to the control unit 336 by appropriate means, such as cabling (not shown). The scale 354 is adapted to measure the weight of anything located on the platform 312 and provide data indicative thereof to the control unit 336.

The system 300 also includes a cyclone generator 360. The cyclone generator 360 connects to the interior of the chamber 302 by means of one or more inlet ducts or tubes 362. The cyclone generator 360 is connected to a source of air, such as ambient air. The cyclone generator 360 provides flow of air through the interior of the chamber 302. The cyclonic generator 360 may include an electric driven impeller or blower to create the air flow. The inlet ducts 362 are located and arranged to create a circular, cyclonic airflow within the chamber 302. The cyclone generator 360 is operatively connected to and operates under the control of the control unit 336. In one embodiment, the cyclonic generator 360 provides suction (negative pressure) in a vertical direction to remove loose unwanted powder 316. The cyclonic generator 360 may force unwanted powder 316 towards the top or bottom of the chamber 302.

Mounted in the chamber 302 are one or more audio transducers 366. The audio transducers 366 may be horns, speakers, diaphragms, vibratory plates or membranes, or other devices capable of forming audio (i.e., sonic, acoustic) waves. The audio transducers 366 are adapted to provide audio waves in the air inside the chamber 302. The audio transducers 366 are adapted to provide audio waves at different frequencies and amplitudes based on signals input thereto. In this embodiment, the audio transducers 366 are mounted and oriented to project audio waves at the parts 314 and unwanted material 316 on the platform 312. The audio transducers 366 are operatively connected to an amplifier 368, which in turn is connected to the control unit 336.

The system 300 also includes a profile database 370. The profile database 370 is a data storage adapted to contain various different operational profiles or recipes. The operational profiles are comprised of stored data that includes operating parameters for different parts to be placed in the system 300 for removal of unwanted material. The profile database 370 is operatively connected to the control unit 336. The profile database 370 may be located with the control unit 336 in the housing 304 or may be located remotely. The profile database 370 is adapted to exchange data with the control unit 336.

Operation

Figure 6:
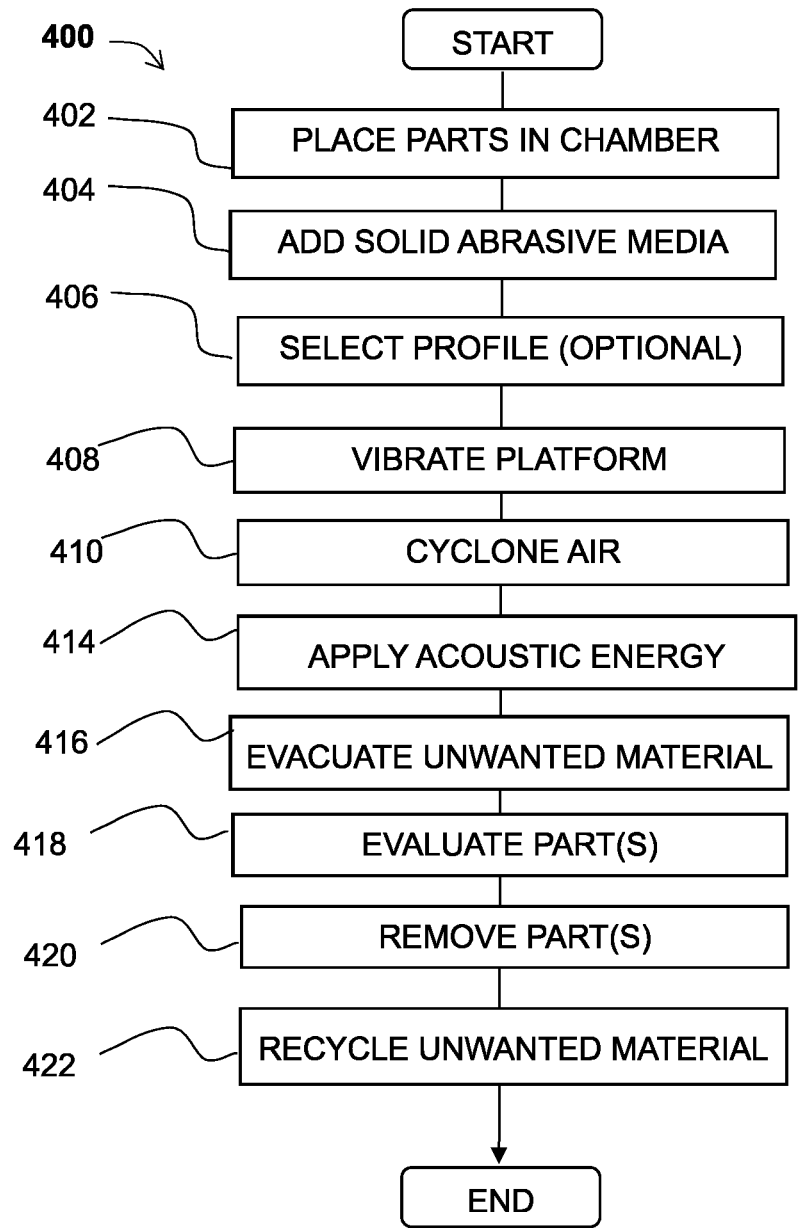
FIG. 6 is a flowchart showing a process performed by the system of FIG. 5.

FIG. 6 shows a flowchart of a process 400 performed by or with the system 300 of FIG. 5. In step 402, the objects 314, which had been manufactured by an additive manufacturing process and which are encased in unwanted material (e.g., powder) 316, are placed on the platform 312 inside the chamber 302.

Next, solid abrasive media 356 is placed on the platform 312 and mixed or interspersed with the parts 314 (Step 404). At this point, the door 308 of the chamber 302 is closed.

If the system 300 is to be operated in automatic mode, a profile can be selected (Step 406). This step is optional. A profile can be selected using the user interface 342. Profiles are stored in the profile database 370. An appropriate profile can be selected based on matching parameters, such as the type of material from which the parts are made, the quantity of parts in the chamber 302, the dimensions of the parts, the geometry of the parts, desired finish properties, and so on. A new profile can also be generated from characteristics and prior history of finishing operations. Alternatively, the system 300 can be operated in a manual mode in which the operating characteristics, such as the air flow, vibrating frequency, vibrating amplitude, temperature, acoustic energy, duration, and so on, are selected by an operator via the user interface 342.

Depending on the operating characteristics chosen, one or more of the following steps are performed. A vibratory motion is applied to the platform 312 (Step 408). The cyclone generator 360 is operated to create a cyclonic airflow in the chamber (Step 410). The acoustic transducer (s) 366 are operated to create sonic waves that impact the parts 314 and unwanted material 316 (Step 414). Unwanted material 316 that falls to the bottom of the chamber 302 is evacuated via the chute 344 and exhaust 346 (Step 416). The parts 324 are evaluated to determine the progress of the removal of the unwanted material 316 (Step 418). This evaluation step may be performed after a duration of time, regularly, intermittently, or continuously. This evaluation step may be performed using input from the scale 354, the cameras 350, the other sensors 352, direct visual observation, or other means. The evaluation step may be performed with the assistance of software tools, such as image recognition or machine vision programming that evaluates the progress of the removal of the unwanted material. These steps (Steps 408, 410, 414, 416, 418) may be performed all at once, or may be performed in a stages one or more at a time, in overlapping stages or non-overlapping stages, or may be performed cyclically, on-off, intermittently, or according to another scheme or routine.

After the unwanted material 316 is sufficiently removed, the parts 314 are removed from the chamber 302 (Step 420). The unwanted material 316 which has been evacuated via the exhaust 346 is recycled or otherwise disposed of (Step 422).

Second Alternative Embodiment

FIGS. 7A and 7B show another alternative embodiment of a system 500 for removing unwanted material from additively manufactured parts. Referring to FIGS. 7A and 7B, a chamber 502 includes a vibratory platform 512. Parts (not shown) to be cleaned (decaked) can be placed on the vibratory platform 512. The vibratory platform 512 is mounted in a slidable tray 513 that enables the vibratory platform 512 to be slid from a position outside the chamber 502 (as shown in FIG. 7A) into a position inside the chamber 502 (shown in FIG. 7B). The slidable tray 513 enables the vibratory platform 512 to be slid into a position outside the chamber 502 to facilitate placing parts onto the vibratory platform 512 and inspecting the parts to evaluate the progress of removal of unwanted material. This enables an operator to remove some parts that are finished, leave other parts that need more processing on the platform 512, and add additional parts if there is room on the platform 512. In FIGS. 7A and 7B, the unwanted material that is removed from the additively manufactured parts falls off the vibratory platform 512 to a lower chamber portion 508. The lower chamber portion 508 is mounted in a slidable tray 509 that enables the lower chamber portion 508 to be slid from a position outside the chamber 502 (as shown in FIG. 7A) into a position inside the chamber 502 (shown in FIG. 7B). The embodiment 500 shown in FIGS. 7A and 7B also includes glove ports 511 for using gloves (not shown). Gloves enable an operator to examine (through a viewing pane, not shown) and arrange parts on the platform 512 without opening the chamber 502. The embodiment of the system 500 in FIGS. 7A and 7B can be operated in a manner similar to the system 200 shown in FIGS. 1, 2, and 4 or the system 300 shown in FIG. 5.

Third Alternative Embodiment

Figure 9:
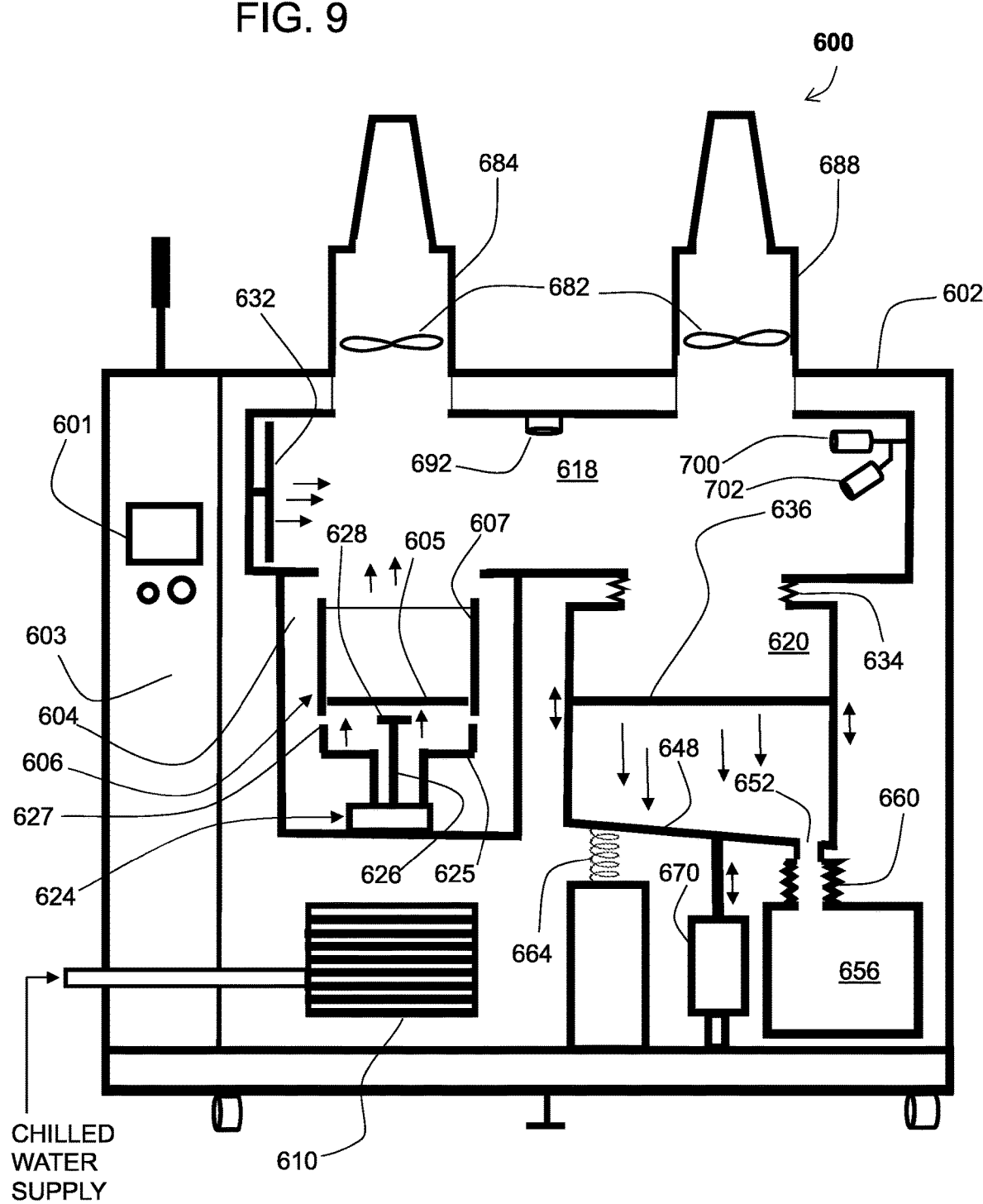
FIG. 9 is a cutaway side view of another embodiment of a system for removing unwanted material from additively manufactured parts.
Figure 10:
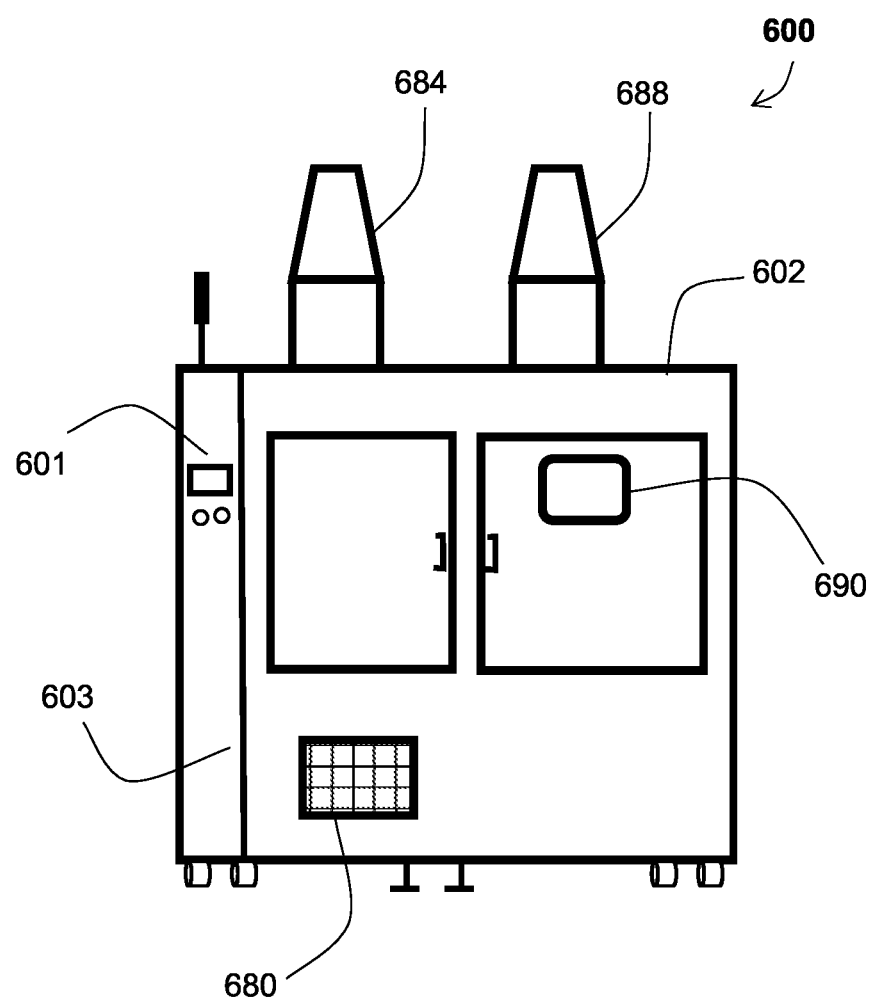
FIG. 10 shows a side view of an outside of the system shown in FIG. 9.

FIGS. 9 and 10 show another alternative embodiment. FIGS. 9 and 10 show a system 600 for removing powder from additively manufactured objects. The system 600 uses processes similar to the other embodiments disclosed herein to remove powder from 3D printed objects. The system 600 includes additional components and features including features that facilitate handling and transfer of objects encased in powder from a 3D printer that produced the objects.

The system 600 includes a housing 602 that contains multiple compartments and chambers, as described herein. The system 600 includes a control panel 601. The control panel 601 is located at a side of the housing 602 in an enclosure 603 or alternatively the control panel 601 can be located elsewhere at a convenient location on or in the housing 602. The control panel 601 includes a user interface. The user interface enables an operator to input instructions, commands, parameters, and other information into the system 600 as well as receive information and other output from the system 600. The control panel 601 is connected to a controller of the system 600.

FIG. 9 shows the housing 602 with its front panels removed. Inside the housing 602 is a receiving area 604. The receiving area 604 has a size and dimensions to receive therein an exchangeable printing frame 606. The exchangeable printing frame 606 is a component used in a 3D printer that uses powder bed technology to produce objects. The exchangeable printing frame 606 is a box-like structure comprised of outer side walls 607 with an open upper side and a bottom floor comprised of a movable platform 605 that can translate vertically up and down within the outer side walls 607.

In a powder bed 3D printer, an object is printed in a printing frame a layer at a time. In a 3D printer, with the platform 605 located in an upper position relative to the outer side walls 607, a bed of powder is spread over the platform 605. An energy beam (e.g., a laser, UV light, electron, etc.) is directed across the bed of powder causing the powder to fuse thereby forming a layer of the object. Then, the movable platform 605 is lowered slightly relative to the outer side walls 607 and another layer of powder is spread over the movable platform 605. The beam is directed across the new layer of powder to form another layer of the object. The process is repeated to form the entire object. Depending on the sizes of the objects being printed, multiple objects can be printed in the exchangeable printing frame 606 at the same time. When the printing is finished, the movable platform 605 is at a bottom position in the exchangeable printing frame 606 and the entire formed solid objects are encased in unfused powder in the exchangeable printing frame 606.

In the system 600 in FIG. 9, the exchangeable printing frame 606 from a 3D powder bed printer is fitted into the receiving area 604. In this embodiment, the receiving area 604 includes a tray that can be slid outward from the receiving area 604 to receive therein the exchangeable printing frame 606. After the exchangeable printing frame 606 is installed in the tray, the tray is slid back into the receiving area 604. The exchangeable printing frame 606 contains the objects that were printed by the 3D printer as well as the unfused powder surrounding and encasing the objects. In this embodiment, the receiving area 604 has specific dimensions to accommodate an exchangeable printing frame from a specific 3D printer. In alternative embodiments, the receiving area 604 may have different dimensions to accommodate sizes of frames from different printers. Alternatively, the receiving area 604 may have adjustable dimensions that can be adjusted to accommodate different sizes of frames from different 3D printers. In one embodiment, a sealing member (not shown) engages the exchangeable printing frame 606 to provide an airtight seal around it.

Below the receiving area 604 is a cooling device 610. In one embodiment, the cooling device 610 is a radiator that receives a circulating fluid, such as chilled water or water from a facility water supply. The cooling device 610 serves to reduce the temperature of the powder and objects in the exchangeable printing frame 606, if necessary. In one embodiment, it is preferable that the powder and objects in the exchangeable printing frame 606 be below approximately 100° C. One or more temperature sensors (not shown) located in the receiving area 602 can be used to measure the temperature of the powder and objects in the exchangeable printing frame 606 in the receiving area 602.

Adjacent to the receiving area 604 is a processing chamber 620 (or parts bin). Above the receiving area 604 and the processing chamber 620 is a transfer chamber 618. The transfer chamber 618 extends horizontally over the receiving area 602 and the processing chamber 620. A bottom wall of the transfer chamber 618 includes a first opening into the receiving area 602 and a second opening into the processing chamber 620.

A lift mechanism 624 is located below the receiving area 604. The lift mechanism 624 includes two components: an outer portion component 625 and an inner portion component 626. An upper end 627 of the outer portion component 625 engages the outer walls 607 of the exchangeable printing frame 606 when the exchangeable printing frame 606 is in the receiving area 602. An upper end 628 of the inner portion component 626 engages the movable platform 605 of the exchangeable printing frame 606 when the exchangeable printing frame 606 is in the receiving area 602. The lift mechanism 624 is operable to elevate the exchangeable printing frame 606 toward the opening into the transfer chamber 618. When an upper side of the exchangeable printing frame 606 is aligned and sealed with a bottom of the transfer chamber 620, the outer portion component 625 ceases to elevate the outer walls 607 of the exchangeable printing frame 606 but the inner portion component 626 continues to elevate the movable platform 605 of the exchangeable printing frame 606 thereby causing all the powder in the exchangeable printing frame 606, as well as the printed objects encased in the powder, to be pushed into the transfer chamber 618 through the opening in the bottom wall thereof. The transfer chamber 618 and the receiving area 604 are connected with an airtight seal to prevent or minimize the escape of powder when the lift mechanism 624 pushes the powder and objects from the exchangeable printing frame 606 into the transfer chamber 618.

In the transfer chamber 618 is a movable decoating wall panel 632. Before the lift mechanism 624 pushes the powder and objects into the transfer chamber 618, the movable decoating wall panel 632 is located in the transfer chamber 618 at an end opposite the processing chamber 620. The movable decoating wall panel 632 is operable to translate horizontally across the transfer chamber 618 to push the powder and objects encased therein received from the receiving area 604 horizontally through the transfer chamber 618 toward the opening in the bottom wall of the transfer chamber 618 into the processing chamber 620 so that the powder and objects encased therein drop into the processing chamber 620. In one embodiment, a sealing member (not shown) engages the decoating wall panel 632 to provide an airtight seal around it.

An upper bellows 634 connects the transfer chamber 618 to the processing chamber 620. The upper bellows 634 forms an airtight seal between the transfer chamber 618 and the processing chamber 620 yet allows for relative movement between the transfer chamber 618 and the processing chamber 620.

Figure 11:
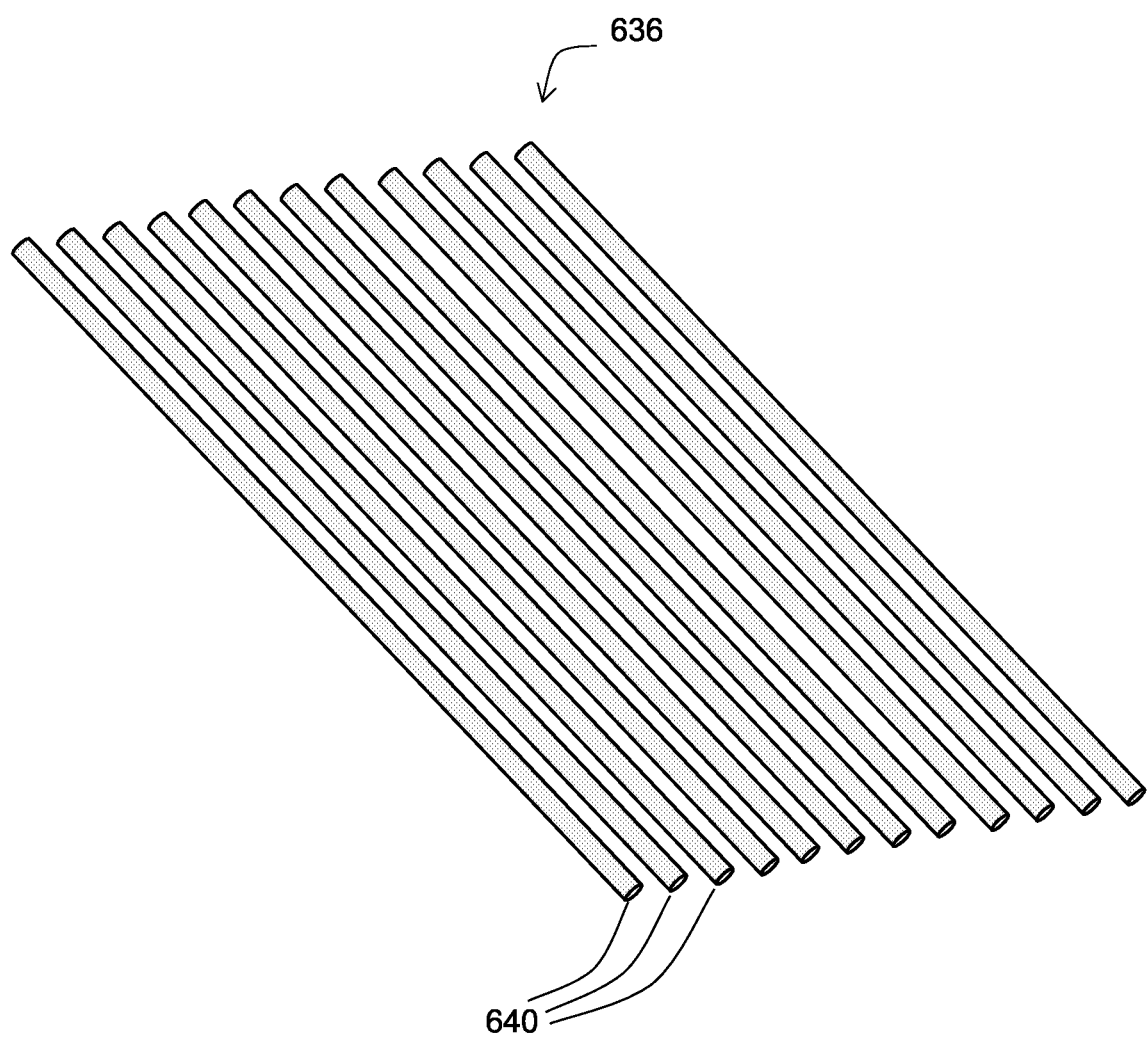
FIG. 11 show a perspective view of the processing platform in the system shown in FIG. 9.

The processing chamber 620 includes a processing platform 636. The processing platform 636 is located approximately midway between a top and a bottom of the processing chamber 636. The processing platform 636 has a structure that allows powder to pass through it but prevent objects from passing through it. Referring to FIG. 11, in this embodiment, the processing platform 636 is formed of a plurality of rods 640 that extend across the processing chamber 620. Each of the rods 640 has a diameter of approximately 6.35 mm (¼ inch). The rods 640 are spaced from each other leaving a gap of approximately 3.17 mm (⅛ inch) between adjacent rods. The rods 640 are composed of a durable material, such as stainless steel. The rods 640 are affixed to the sides of the processing chamber 620. When the movable wall panel 632 pushes the powder and objects encased therein into the processing chamber 620, the powder and objects encased therein fall onto the processing platform 636.

Referring again to FIG. 9, located in a bottom floor 648 of the processing chamber 620 is an exit chute 652. The bottom floor 648 of the processing chamber 620 is slanted downward towards the exit chute 652.

Located below the exit chute 652 is a powder collection bin 656. A lower bellows 660 connects the exit chute 652 to the powder collection bin 656. The lower bellows 660 forms an airtight seal between the processing chamber 620 and the powder collection bin 656 yet allows for relative movement between the powder collection bin 656 and the processing chamber 620.

The processing chamber 620 is supported from its bottom on a plurality of springs 664 (only one of which is shown). The springs 664 allow the processing chamber 620 to move or vibrate. In one embodiment the springs 664 allow the processing chamber 620 to move vertically up and down.

Connected to the bottom of the processing chamber 620 is a driver (or shaker) 670. The driver 670 is a device that has an output shaft that oscillates up-and-down at selectable speeds, frequencies, and amplitudes. The connection of the driver 670 to the processing chamber 620 is fixed so that the driver 670 can cause the processing chamber 620 to move up and down at selectable speeds, frequencies, and amplitudes. A cooling device, such as a fan, (not shown) is associated with the driver 670 to reduce or prevent overheating.

The system 600 can be operated to receive an entire exchangeable printer frame containing 3D printed objects still encased in powder, automatically dispense the powder and objects encased from the exchangeable printer frame into the processing chamber whereupon the powder can be removed from the objects. The embodiment of the system 600 provides for recovery of much or all the unfused powder with minimal or no handling on the part of an operator.

Once the powder and objects encased in the powder (and optionally abrasive material) are located on the processing platform 636 in the processing chamber 620, the driver 670 is operated to cause the entire processing chamber 620 to move (or oscillate or vibrate). As described in connection with other embodiments, the operating parameters, i.e., including frequency, amplitude, and duration of vibration, are selectable. Selection of appropriate operating parameters, including frequency, amplitude, and duration of vibration, is based on factors including efficient removal of powder, reducing damage to the objects, and amount of powder to be removed. Selection of an appropriate frequency, amplitude, and duration of vibration takes into account information and parameters about the powder and the objects encased in the powder, including the sizes of the objects, wall thicknesses of the objects, material composition of the objects, internal and external surfaces, and internal passages, as well as other factors. In one embodiment, information and parameters about the objects are obtained from the design file used by the 3D printer to produce the objects. In this embodiment, information and parameters about the objects in the design file are used to select appropriate operating parameters, including frequency, amplitude, and duration of vibration, to depowder the objects in the processing chamber 620. One or more cycles, each with a different set of operating parameters, may be determined. Use of the design file information to select appropriate operating parameters for frequency, amplitude, and duration of vibration in the processing chamber 620 can be done automatically by software programming in the system 600, or alternatively the use of the design file information to select appropriate operating parameters for frequency, amplitude, and duration of vibration in the processing chamber 620 can be done manually or by an operator or by reference to previously stored recipes or profiles.

In one embodiment, the processing chamber 620 is vibrated at a subsonic frequency. Other higher or lower frequencies may be used including sonic or ultrasonic. For example, the processing chamber 620 is vibrated at a frequency between 10-500 hertz. The amplitude of displacement of the processing chamber 620 when it is vibrated is related to the frequency and acceleration. In exemplary embodiments, the displacement can be approximately 0.75 inches (2 cm).

In one embodiment, operating parameters, including frequency, amplitude, and duration, are selected to impart more than 1 g acceleration to the processing chamber 620. For example, operating parameters are selected to impart 2 g or more acceleration with a sinusoidal wave motion to the processing chamber 620. When the processing chamber 620 is vibrated at greater than 1 g acceleration, objects and powder (which fall at 1 g) in the processing chamber 620 become suspended above the processing platform 636 when the processing chamber 620 is accelerating downward. When the processing chamber 620 reverses direction and begins to accelerate upward, impacts occur between the upward moving processing platform 636 and the powder or objects which are falling downward toward the processing platform 636. These impacts can serve to shake the powder off of the objects. Likewise, if there are depowdered objects on the upward moving processing platform 636, there are impacts between these depowdered objects and falling powder or objects above the depowdered objects on the processing platform 636. These impacts can also serve to shake powder off of objects.

In one embodiment, the operating parameters (i.e., frequency, amplitude and duration of vibration) selected and applied to the processing chamber 620 are chosen to cause the objects encased in powder to vibrate in resonance. The objects encased in powder may have a resonant frequency that is different from the powder in which the objects are encased. When the processing chamber 620 is vibrated at a frequency that induces the objects to vibrate in resonance, the objects will vibrate (i.e., move) relative to the powder encasing them. This process can facilitate powder removal from the objects. This process can also facilitate powder removal from internal passages located inside the objects.

The amount of time required to depowder the objects in the printing frame can vary depending on the size of the objects, the geometries of the objects, temperature, and various other factors. For example, the duration of operation may range from approximately a minute to approximately an hour.

As the processing chamber 620 is vibrated, powder removed from the objects passes through the gaps between the rods 640 of the processing platform 636, falls to the bottom of the processing chamber 620, down the exit chute 652, and collects in the powder collection bin 656. The powder collection bin 656 is removable so that when the depowdering operation is finished, the entire powder collection bin 656, filled with powder, can be removed. A fork lift or other appropriate lift mechanism may be used, if appropriate. The powder collected in the powder collection bin 656 can be recycled or otherwise appropriately disposed of.

The system 600 includes a ventilation system (e.g., air circulation). The ventilation system is designed to reduce or eliminate air or powder from escaping from inside the housing 602. The ventilation system maintains a pressure inside the housing lower than the air pressure outside the housing 602. Located in the housing 602 directly adjacent the location of the cooling device 610 is an air inlet 680, shown in FIG. 10. An air filter (not shown) is located directly behind the air inlet 680. The system 600 includes first and second exhaust stacks 684 and 688 connected to and extending from the top of the housing 602. One or more air filters (not shown) are located in line with each of the exhaust stacks 684 and 688. The ventilation system includes one or more fans 682 (shown in FIG. 9) associated with the exhaust stacks 684 and 688. The fans 682 draw air into the housing 602 through the air inlet 680 and expel air from the housing 602 through the first and second exhaust stacks 684 and 688. The doors and panels on the housing 602 are airtight and include airtight seals to reduce or prevent passage of air into or out of the housing except through the air inlet 680 and exhaust stacks 684 and 688.

As shown in FIG. 10, the housing 602 includes a viewing window 690. The viewing window 690 is located adjacent to the transfer chamber 618. The viewing window 690 enables an operator to view the contents of the transfer chamber 618 as well as into the processing chamber 620. A light fixture 692 (shown in FIG. 9) is located in the transfer chamber 618 to help viewing the interior of the transfer chamber 618 and the processing chamber 620 through the viewing window 690.

The system 600 includes one or more cameras 700 and 702 located inside the housing 602. More specifically, the cameras 700 and 702 are located in the transfer chamber 618. One of the cameras 700 is aimed toward the receiving area end of the transfer chamber 618. The other camera 702 is aimed downward toward the processing chamber 620. The outputs of the cameras 700 and 702 are provided to the control panel 601 where the video from the cameras can be viewed. The outputs of the cameras 700 and 702 are also stored as data files for later viewing and analysis.

The embodiment of the system 600 includes sound insulation material. The processing chamber 620 can be operated at audible frequencies. Sound insulation can be installed lining interior sides of the panels from which the housing 602 is formed to reduce noise levels outside the system 600 during operation.

The housing 602 and internal compartments and chambers, including the receiving area 604, transfer chamber 618, processing chamber 620, and powder collection bin 656 are composed of durable, rigid, non-reactive materials such as steel, powder-coated steel, stainless steel, aluminum, or high-strength plastics.

The system 600 includes various sensors used to monitor operation of the system and to provide that the system and its components are operating properly. An accelerometer is associated with the driver 670 and another accelerometer is associated with the processing chamber 620 to measure and detect movement of these components. One or more temperature sensors (e.g., thermocouples, infrared sensors, etc.) are associated with the transfer chamber 618, the cooling device 610, the driver 670, and the powder collection bin 656. Sound sensors are located inside and/or outside the housing 602 to detect noise levels. Pressure differential sensors are located on upstream and downstream sides of the filters, for example to detect clogging. Motion or displacement sensors are associated with the door panels to detect closure status. One or more particle sensors may be located inside the housing 602 to detect for possible leakage of powder from the processing chamber 620. The system 600 may include other sensors in addition to those mentioned above. The sensors provide their outputs to the controller of the system 600.

The system 600 includes several advantages.

One advantage of the system 600 is provided by the processing platform 636. As described above and shown in FIG. 11, the processing platform 636 is formed of a plurality of rods 640 that extend across the processing chamber 620. The processing platform 636 allows powder shaken off the objects to pass through gaps between the rods 640 and fall to the bottom of the processing chamber 620 while preventing the objects being depowdered from passing through. The rods 640 present relatively low friction horizontally thereby allowing objects to move horizontally along the rods 640 across the processing platform 636. Providing gaps that allow objects to move horizontally along the processing platform 636 is preferable to providing a grid of small openings because an object may become stuck in a small opening thereby clogging the opening and possibly damaging the object. However, by using rods with gaps between them, objects are able to slide horizontally thereby not clogging the gaps and reducing the possibility of damage to the objects.

Another advantage of the embodiment of the system 600 in FIGS. 9 and 10 is that it can handle large outputs from a powder bed 3D printer. The system 600 is capable of removing the powder from all the objects in an entire exchangeable printing frame at one time in a single operation. Such a frame can weigh up to approximately 90 kg (200 pounds).

Another advantage of the system 600 in FIGS. 9 and 10 is that it reduces handling of the objects from the 3D printer. With the system 600, the entire printing frame containing the objects and the unfused powder is installed in the receiving area without the need for an operator to remove the powder and objects from the printing frame. Removal of the powder and objects takes place internally in the housing of the system 600 thereby reducing the amount of powder escaping and increasing the amount of powder that can be recovered or recycled.

Other Alternatives

In one of the embodiments disclosed above, it was described that a solid abrasive media was placed with the parts to be cleaned or finished on the vibratory platform. In an alternative embodiment, the parts can be cleaned or finished without adding a solid abrasive media. In this alternative, the parts to be cleaned or finished are placed on the vibratory platform, which is vibrated for a period of time. This alternative may be suitable for some types of parts, such as particularly delicate parts.

In an embodiment described above, the system operates without application of other material removal technologies. In alternative embodiments, a system using a vibratory platform for removal of unwanted material may also use other technologies to supplement, augment or complement unwanted material removal. Such other technologies may include application of acoustic energy, pressurized sprays (liquid, solids, or gaseous) or application of chemicals, such as detergents. These other technologies may be incorporated into the same system or chamber that includes the vibratory platform or may be located in another chamber located adjacent to or in-line with the chamber that includes the vibratory platform.

In the embodiments in FIGS. 2, 5, 7A and 7B, the vibratory platform is solid. In an alternative embodiment, the vibratory platform includes openings so that any unwanted material detaching from the parts will fall through the openings to the bottom of the chamber. The openings may be of any suitable size or type, including without limitation a mesh construction. Instead of openings, the platform may be made of other constructions that allow material detaching from the parts to fall to the bottom of the chamber.

In embodiments disclosed above, the removal of unwanted material from an additively manufactured object can be conducted at room temperature. In alternative embodiments, heat may be applied in conjunction with a vibratory platform to facilitate removal of unwanted material from additively manufactured parts. To apply heat to facilitate removal of unwanted material from additively manufactured parts, a heating element may be included in the chamber of the system. The heater may be operated under control of the control unit. Alternatively, a heater may be operated based on input provided by a user through the user interface. In still further alternative embodiments, the system may include a cooling element to cool or refrigerate the air in the chamber during the material removal process. The cooling element may be operated under control of the control unit based on information contained in a profile or may be operated based on input provided by a user through the user interface. In further alternatives the system may include both a heating element and a cooling element.

In various different embodiments, different kinds of vibrations, different kinds of waveforms, different frequencies of waves, and different amplitudes of waves may be applied to the vibratory platform. Different kinds of waveforms include sine waves, square waves, sawtooth waves, as well as others. In some alternatives, multiple different vibrations, multiple different waveforms, multiple different amplitudes, multiple different frequencies of waves, or combinations thereof, may be applied at the same time to parts in the chamber. When applying different vibrations, waveforms, amplitudes or frequencies, the different vibrations, waveforms, amplitudes or frequencies may be applied from the same vibratory platform. The frequency being applied to the vibratory platform may be in the audible range, the ultrasonic range, or any other range.

In some of the embodiments described above, the interior of the chamber is maintained at atmospheric pressure. In other alternatives, the chamber may be maintained at a pressure that is higher or lower than atmospheric pressure, including near vacuum pressures. Alternatively, the pressure in the interior of the chamber may be changed during the material removal process. The pressure changes and the timing of the changes may be specified in the profile.

In the embodiments described above, an operating profile was selected by the user. In another alternative, the user may specify some or all the operating parameters manually. In another alternative, the operating parameters may be specified by the entity that performed the 3D printing portion of the additive manufacturing process.

In another alternative, the system automatically measures the progress of unwanted material removal while the material is being removed, and automatically auto-adjusts the operating parameters to improve or complete the removal process. This alternative may employ the AUTOMAT3D® technology developed by PostProcess Technologies, Inc. An embodiment of this technology is disclosed in copending patent application US20190315065, the entire disclosure of which is incorporated by reference herein. Sensors in the chamber measure the progress of the material removal process and feedback this information to a digital file that is used to modify or adjust the operating parameters.

In still another alternative, the unwanted material removal system is part of an overall additive manufacturing system that includes the object formation portion as well as the unwanted material removal portion. According to this alternative, the design file for object formation (e.g., a CAD file) and the operating profiles for material removal are part of an overall design file that both forms the object and removes unwanted material. In such an alternative, object formation and unwanted material removal are designed together for overall optimization and efficiency of object manufacturing. One alternative is the CONNECT3D® technology developed by PostProcess Technologies, Inc. An embodiment of this technology disclosed in copending patent application US20190275745, the entire disclosure of which is incorporated by reference herein. In some automated embodiments, the material removal process may be performed without user input or in a closed loop. Further, in some embodiments of an overall additive manufacturing system, the object may be moved on a conveyor, by robotic arm, or other means from the location where the object is formed to another location where vibratory energy is applied to remove unwanted material. In still other embodiments, vibratory energy is applied to remove unwanted material from an additively manufactured object in the same location (e.g., chamber) where the object is formed.

In some of the embodiments, the interior walls of the chamber are anechoic, or otherwise adapted so as to enhance or not detract from delivery of energy to the object(s) and material on the platform.

Different frequencies can be applied to the vibratory platform. In one embodiment, a frequency of between 75 and 135 Hertz is used. In another alternative, a frequency of between 35-135 Hertz is used. In yet another alternative, a frequency of between 10-500 hertz is used. Other frequencies may be suitable. The platform may vibrate continuously or intermittently, for example to facilitate powder removal. Movement of the platform may be specified in the operating profile.

In embodiments described above, the medium inside the chamber is air. In alternative embodiments, other fluid media either gaseous or liquid may be used inside the chamber.

In another alternative embodiment, the platform rotates, i.e., a rotating turntable.

Advantages

The disclosed embodiments have several advantages. One advantage is that the unwanted material can be readily recycled. Compared to material removal systems that use a liquid spray, the disclosed embodiments provide for relatively easier recovery of removed material for recycling. Compared to material removal systems that use a liquid spray, the disclosed embodiments do not require filtering of the liquid after spraying for reuse, recovery or recycling of the liquid and/or recycling of the removed material. Compared to material removal systems that use application of chemicals, the disclosed embodiments have the advantage that the unwanted material is removed from additively manufactured objects without having the objects come in contact with any chemicals. Furthermore, compared to material removal systems that use application of chemicals, the disclosed embodiments avoid the costs (including disposal costs) of such chemicals.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the disclosure. The claims should not be read as limited to the described order or elements unless stated to that effect. Therefore, all embodiments that come within the scope and spirit of the following claims and equivalents thereto are claimed as the disclosure.

The invention claimed is:

1. A system for removal of unwanted material from additively manufactured parts comprising:
    a housing;
    a processing chamber located in the housing;
    a receiving area located in the housing having dimensions suitable for receiving therein a printing frame containing the additively manufactured parts encased in the unwanted material;
    a transfer area located in the housing associated with the receiving area;
    a lift mechanism operable to lift the additively manufactured parts and unwanted material into the transfer area;
    a movable wall associated with the transfer area and operable to push the additively manufactured parts and unwanted material into the processing chamber;
    a platform mounted in the processing chamber, the platform having a vibratory area operatively adapted for having placed thereupon the additively manufactured parts from which the unwanted material is to be removed wherein the additively manufactured parts are unaffixed to the platform, and further wherein said platform includes openings so that said unwanted material detaching from the additively manufactured parts will fall through the openings to a bottom of the processing chamber; and
    an actuator connected to the vibratory area operative to cause the vibratory area to vibrate and cause the additively manufactured parts that had been placed thereupon to bounce, wherein the unwanted material around the additively manufactured parts is removed and falls through the openings.

2. The system of claim 1 wherein at least a portion of the platform is spaced from an inner wall of the processing chamber by a gap so that the unwanted material can fall to a bottom of the processing chamber through the gap.

3. The system of claim 1 wherein the platform is comprised of a plurality of rods each of which is spaced from an adjacent rod by a gap thereby forming a plurality of gaps, wherein each gap has a dimension small enough so that the additively manufactured parts are prevented from passing through the gap, and further wherein said plurality of gaps comprises said openings.

4. The system of claim 1 further comprising:
    a ventilation system that circulates air across the additively manufactured parts on the vibratory area wherein removal of unwanted material is facilitated.

5. The system of claim 1 further comprising:
    an exhaust for removing the unwanted material from the processing chamber after the unwanted material has been removed from the additively manufactured parts.

6. The system of claim 1 further comprising:
    acoustic transducers located in the processing chamber and operatively adapted for directing acoustic energy waves at the additively manufactured parts to facilitate removal of the unwanted material therefrom.

7. The system of claim 1 further comprising:
    at least one camera adapted for obtaining imagery of the additively manufactured parts and the unwanted material in the processing chamber.

8. The system of claim 1 further comprising:
    glove ports located in a wall of the processing chamber.

9. The system of claim 1 further comprising:
    a powder collection bin located below the processing chamber and into which unwanted material falls after being removed from the additively manufactured parts.

10. The system of claim 1 wherein the printing frame was used in an additive manufacturing printer that was used to print the additively manufactured parts and wherein the additive manufacturing printer uses selective laser sintering, electron beam melting, multi jet fusion, or powder bed fusion processes to manufacture parts.

11. A method for removal of unwanted material from additively manufactured parts comprising:
    receiving a printing frame containing the additively manufactured parts encased in the unwanted material into a receiving area of a housing of a system, wherein the printing frame was used in an additive manufacturing printer that was used to print the additively manufactured parts;

pushing the additively manufactured parts encased in the unwanted material from the printing frame into a transfer chamber in the housing;

pushing the additively manufactured parts encased in the unwanted material from the transfer chamber onto a platform in a processing chamber in the housing, wherein the additively manufactured parts are unaffixed to the platform; and causing at least an area of the platform to vibrate and thereby causing the additively manufactured parts that had been placed thereupon to bounce, whereby the unwanted material detaches from the additively manufactured parts.

12. The method of claim 11 further comprising:
adding solid abrasive media to the additively manufactured parts on the platform.

13. The method of claim 11 wherein the platform is caused to vibrate at a frequency of between 10 and 500 Hertz.

14. The method of claim 11 further comprising:
causing a cyclonic air flow within the processing chamber to facilitate removal of the unwanted material from the additively manufactured parts.

15. The method of claim 11 further comprising:
removing the unwanted material from the processing chamber; and
recycling the unwanted material.

16. The method of claim 11 wherein the area of the platform is caused to vibrate at a frequency at which either the additive manufactured parts or the unwanted material vibrates in resonance.

17. The method of claim 11 wherein the additive manufactured parts are produced by selective laser sintering, electron beam melting, multi jet fusion, or powder bed fusion processes.

* * * * *